United States Patent
Alqanee

(10) Patent No.: US 8,591,729 B2
(45) Date of Patent: Nov. 26, 2013

(54) STORM DRAIN WITH WATER TRAP

(71) Applicant: Jasem M. J. Alqanee, Alsalam (KW)

(72) Inventor: Jasem M. J. Alqanee, Alsalam (KW)

(*) Notice: Subject to any disclaimer, the term of this patent is extended or adjusted under 35 U.S.C. 154(b) by 0 days.

(21) Appl. No.: 13/682,582

(22) Filed: Nov. 20, 2012

(65) Prior Publication Data

US 2013/0126406 A1   May 23, 2013

Related U.S. Application Data

(60) Provisional application No. 61/561,903, filed on Nov. 20, 2011.

(51) Int. Cl.
    *E03F 5/04*      (2006.01)
    *E03F 5/06*      (2006.01)
    *B01D 35/02*     (2006.01)

(52) U.S. Cl.
    CPC ............... *E03F 5/0405* (2013.01); *E03F 5/06* (2013.01); *E03F 2005/0417* (2013.01); *B01D 35/02* (2013.01); *B01D 2221/12* (2013.01)
    USPC .......... 210/116; 210/164; 210/170.03; 404/4; 137/247

(58) Field of Classification Search
    USPC ......... 210/116, 163, 164, 170.03; 404/2, 4, 5; 137/247, 403
    See application file for complete search history.

(56) References Cited

U.S. PATENT DOCUMENTS

| | | | | |
|---|---|---|---|---|
| 1,066,316 A | * | 7/1913 | Piper | 404/5 |
| 2,084,338 A | * | 6/1937 | Hamblin | 137/403 |
| 3,838,706 A | * | 10/1974 | Klenk et al. | 137/403 |
| 3,892,257 A | * | 7/1975 | Zia | 137/247 |
| 5,849,198 A | | 12/1998 | Sharpless | |
| 6,143,168 A | * | 11/2000 | Shackelford | 210/164 |
| 6,217,756 B1 | | 4/2001 | Martinez | |
| 6,668,390 B1 | * | 12/2003 | Gonzalez | 210/163 |
| 7,112,274 B1 | | 9/2006 | Sanguinetti | |
| 7,524,414 B1 | | 4/2009 | Barragan | |
| 7,771,591 B2 | | 8/2010 | Lucas | |
| 2004/0065601 A1 | * | 4/2004 | Martinez | 210/163 |

* cited by examiner

*Primary Examiner* — Christopher Upton
(74) *Attorney, Agent, or Firm* — Richard C Litman

(57) ABSTRACT

The storm drain with water trap is installed in the opening of a storm or sewer drain to close off the underlying drain channels and residual water therein from the open air, thus preventing escape of mold, mosquitoes, and other hazards into the air. The device has an insert having an open top and bottom. A shallow water trap pan is suspended below the insert. In dry conditions, the water trap contains little water, the relatively light weight of the trap and contained water allowing it to be lifted by springs against the bottom of the insert to form a seal. When runoff water flows into the drain, the greater amount of water and its weight draws the insert downward, extending the springs and opening a gap between the lower edge of the insert and the water trap pan to allow the runoff water to flow therethrough.

16 Claims, 2 Drawing Sheets

STORM DRAIN WITH WATER TRAP

CROSS-REFERENCE TO RELATED APPLICATION

This application claims the benefit of U.S. Provisional Patent Application Ser. No. 61/561,903, filed Nov. 20, 2011.

BACKGROUND OF THE INVENTION

1. Field of the Invention

The present invention relates to drainage systems, and particularly to a storm drain with a water trap incorporated therewith to prevent the backflow of odors and vermin breeding in the residual water remaining in the storm drain system in dry conditions. The storm drain and water trap are also adaptable to sewer systems having open drains that communicate with the outside atmosphere.

2. Description of the Related Art

Drainage systems for relatively large areas are well known. Virtually all population centers of any appreciable size have a network of drainage passages below the surface. This is even more critical in major population centers, where the majority of the surface area is covered with buildings, paved surfaces, and other non-porous structures. Such drainage systems generally connect to a natural body of water, such as a river or the sea, to allow the collected runoff water to pass safely to a natural water source without producing undue flooding of the city, town, or population center.

Such drainage systems will generally retain some residual runoff water along the bottom portions of their channels and passages, even in drier conditions. This residual water serves as a breeding ground for various undesirable flora and fauna, such as molds, mosquitoes, and the like. The release of mold spores can result in serious allergies for many people, and mosquitoes are well known to transmit many potentially serious and fatal diseases. While the elimination of open pools and puddles of stagnant water can do much to remove these sources of illness and disease, the residual water remaining in conventional storm drain systems remains as a breeding ground for such natural pests.

The above is true of those storm drain systems that are dedicated strictly to the collection of rainwater runoff and the like, and that are not connected to a sanitary sewage system. However, in some areas the storm drain system and the sanitary sewer system are one and the same, so that the storm drain openings allow the offensive odors and other unsanitary elements to escape into the open air.

Thus, a storm drain with water trap solving the aforementioned problems is desired.

SUMMARY OF THE INVENTION

The storm drain with water trap includes an insert having an open top and an open bottom, and downward and inward tapering impervious sidewalls. An upper flange seats within the corresponding recessed lip of a conventional surface storm drain opening. A removable grate is provided atop the insert and on-grade with the storm drain opening. The grate is preferably formed of a durable metal, e.g., corrosion resistant or "stainless" steel, and coated with concrete for economy. The balance of the assembly, i.e., the insert and its water trap, are also preferably formed of corrosion resistant steel.

A water trap comprising a shallow tray or pan having downward and inward tapering sidewalls is suspended beneath the open bottom of the insert. A plurality of springs holds the floor of the tray firmly against the open lower edge of the insert. Preferably, a resilient seal is provided about the lower edge of the insert to seat against the floor of the water trap tray when the springs pull the water trap up into contact with the lower edge of the insert.

In dry conditions, some residual water will remain within the water trap, but the relatively small amount of water will not be sufficient to weigh down the trap and overcome the upward pull of the springs. The water trap will remain tightly seated against the lower edge of the insert, thus sealing the drain system that extends beneath the insert. The small amount of water remaining in the water trap will rapidly evaporate during dry conditions, thus further reducing the weight of the water trap and assuring its seal against the lower edge of the insert.

When significant water runoff flows into the storm drain and enters the insert, for example, due to a rainstorm or snow melt, the water will gather in the insert to a greater depth than the shallow walls of the water trap. However, the water will be retained within the insert, due to the seal of the floor of the trap with the lower edge of the insert, until sufficient water depth and weight is reached to overcome the upward tension of the springs on the water trap. When this occurs, the trap is forced downward by the weight of the water, opening a gap between the floor of the trap and the lower edge of the insert with its seal. The buildup of water will flow through this gap and into the storm drain system. The gap between the floor of the trap and the lower edge of the insert will reach a state of general equilibrium, depending upon the rate of water flow into the insert from the storm drain opening, to allow the water to flow through the system. When the water flow stops, the remaining water flows through the gap, reducing the head of water above the trap and its weight. This allows the springs to lift the trap upward against the overlying lower edge of the insert, once again closing the drain system off from the open air.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The storm drain with water trap provides for the sealing of a storm or sewer drain in dry conditions to prevent the escape of undesirable molds, mosquitoes, and/or other undesirable elements therefrom. When water runoff flows into the drain and water trap, the trap opens to allow the water to flow therethrough to provide proper drainage.

Figure 1:
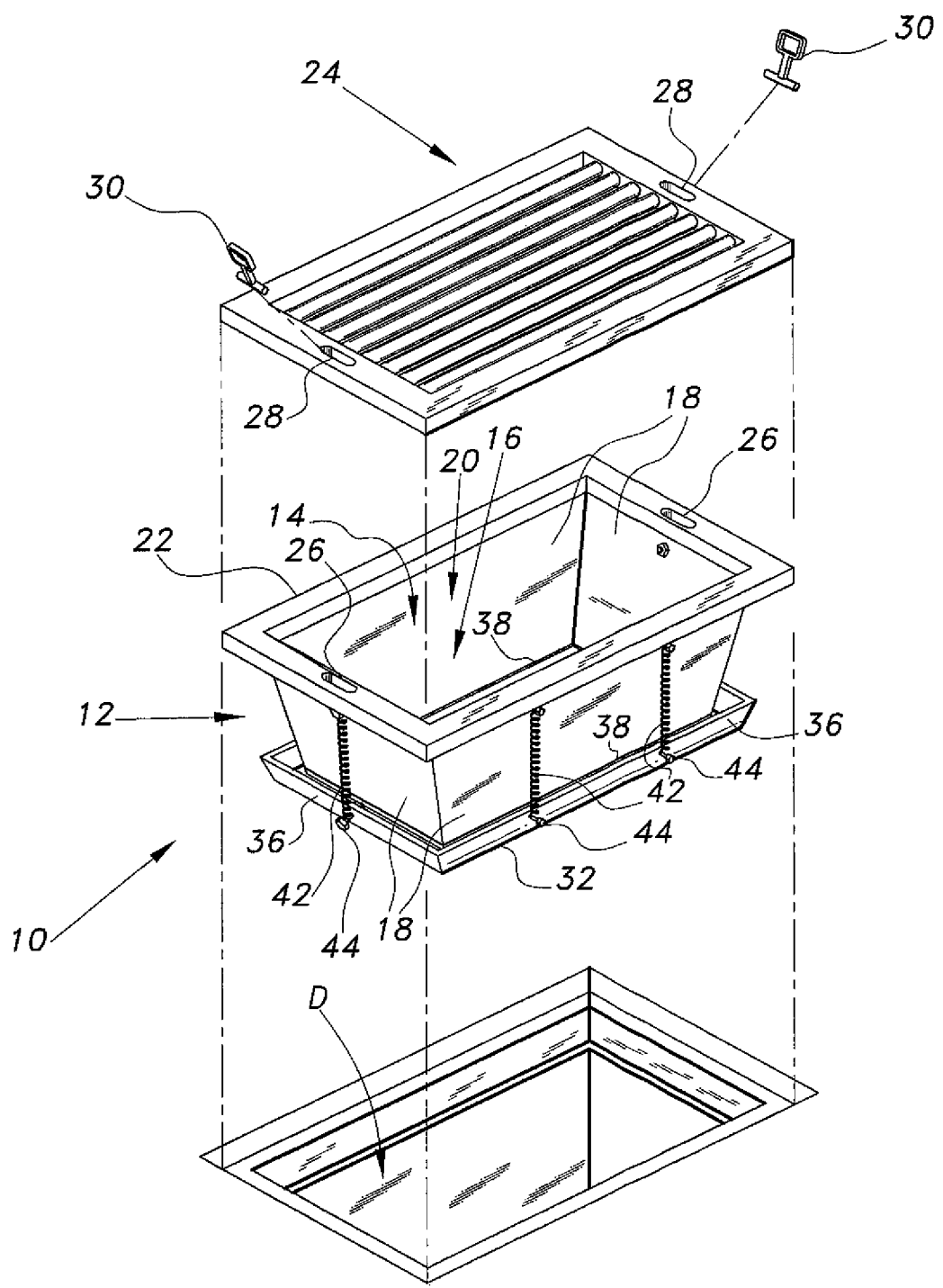
FIG. 1 is an exploded perspective view of a storm drain with water trap according to the present invention, illustrating its various components.

FIG. 1 of the drawings provides an exploded perspective view of the storm drain with water trap 10 assembly. The storm drain and water trap 10 includes a drain insert 12 having an open top 14 and open bottom 16, and liquid impervious walls 18 defining a drain passage 20 therethrough. An upper flange 22 extends outward from the upper edges of the walls 18 of the insert 12. A porous grate 24 is removably attached to the flange 22 of the insert 12. The insert flange 22 may include slots or keyways 26 therein, and the grate 24 may have corresponding passages 28 therethrough for the insertion of keys 30 that are used to secure the grate 24 to the underlying flange 22, and to lift the grate 24 from the insert 12 when required. (FIGS. 2 and 3 show the grate 24 separated from the underlying insert 12, as may be the case in some installations.)

Figure 2:
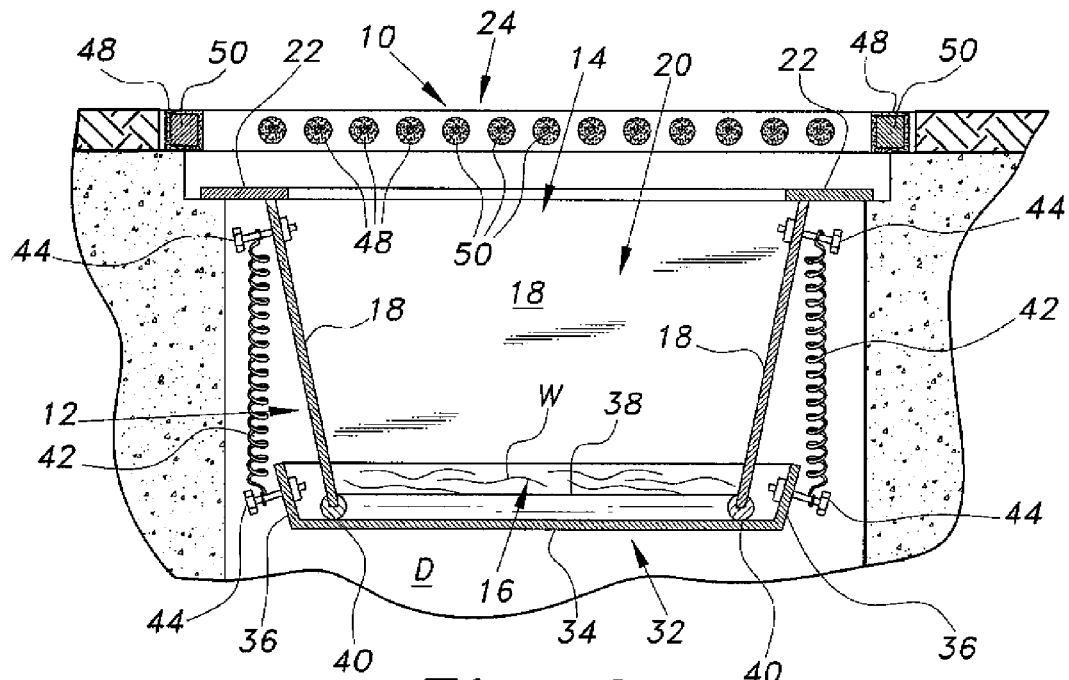
FIG. 2 is an environmental end elevation view in section of the storm drain with water trap according to the present invention, showing the water trap in a closed position to seal the drain.
Figure 3:
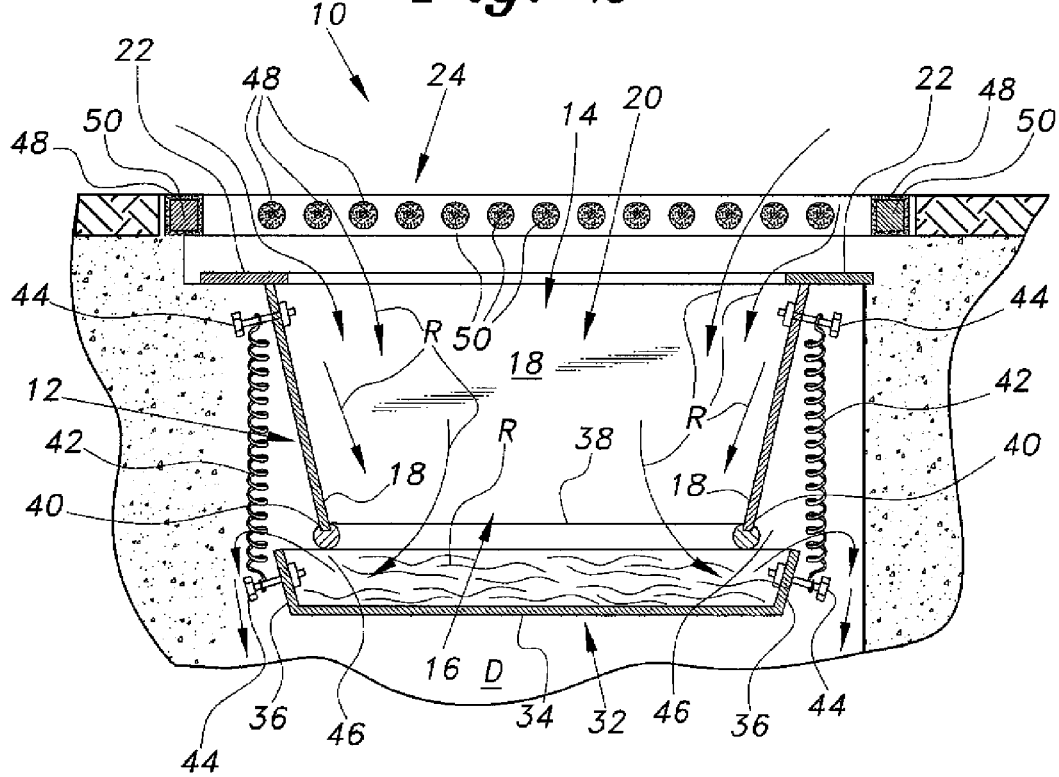
FIG. 3 is an environmental end elevation view in section of the storm drain with water trap according to the present invention, shown similar to FIG. 2, but showing water flowing through the trap and drain.

The insert 12 includes a water trap 32 suspended resiliently therebelow, as shown in detail in FIGS. 2 and 3 of the drawings. The water trap 32 has a liquid impervious floor 34. A plurality of relatively short or low liquid impervious walls 36 extends upward from the periphery thereof. A resilient elastomeric seal 38 (rubber, soft plastic, etc.) is installed along the lower edge 40 of the insert 12, where it bears against the upper or inner surface of the floor 34 of the water trap 32 to seal thereagainst when the trap is drawn upward against the lower edges 40 of the walls 18 of the insert 12. It will be seen particularly in FIGS. 2 and 3 that the walls 18 of the insert 12 and the short walls 36 of the water trap 32 taper upward and outward from their lower edges to their upper edges, the walls 36 of the water trap 32 being disposed outward of the lower portions or edges 40 of the walls 18 of the insert 12. The insert 12, its water trap 32, and the corresponding grate 24 are all illustrated as having rectangular planforms in FIGS. 1 through 3 in order to fit within the conventional rectangular drain D, but the insert, grate, and water trap may have any practicable shape required to conform to the shape of the drain in which the assembly is to be installed.

The water trap 32 is drawn upward against the lower edges 40 of the insert 12, or more precisely, the floor 34 of the trap 32 is drawn against the seal 38 disposed along the lower edges 40 of the insert walls 18 by a plurality of springs 42 that extend from the walls 36 of the water trap 32 to the walls 18 of the insert 12. The springs 42 may be attached to the corresponding walls 18 and 36 of the insert 12 and trap 32 by a series of bolts 44 or other suitable fasteners. The springs 42 are configured to collectively produce slightly more tension than the weight of the water trap 32, thus drawing the trap 32 upward against the overlying seal 38 of the insert 12 when little or no residual water W remains within the trap 32, as shown in FIG. 2 of the drawings. The slight amount of residual water W remaining within the trap 32 in dry conditions is insufficient to cause the springs 42 to extend and allow the trap 32 to drop from the overlying insert 12.

However, in the event of considerable water runoff, e.g., a heavy rainstorm, snow melt, etc., the water runoff R will run through the grate 24 and begin to collect within the insert 12. The weight of this runoff water R as it begins to fill the insert 12 is sufficient to push the water trap 32 downward, away from its seal with the lower edges 40 of the insert walls 18, thus opening a drainage gap or passage 46 between the floor 34 of the trap 32 and the seal 38 on the lower edges 40 of the insert 12. This allows the runoff water R to flow from the insert 12, through the drainage gap 46, and into the storm drain D, where it can flow from the storm drain and water trap assembly 10 and out through the drain system D. The weight and force of the runoff water R flowing into the insert 12 will reach some equilibrium point against the tension of the springs 42, the drain gap 46 being an essentially self-adjusting passage that depends upon the amount of runoff water R entering the insert 12. When no more runoff water R is entering the insert 12, the remaining runoff water flows from the insert 12 through the drain gap or passage 46 until only a slight amount remains in the bottom of the water trap 32. This slight amount is insufficient to keep the springs 42 extended. Thus, the springs 42 draw the trap 32 upward to seal against the bottom of the insert 12 to close off the underlying drain D until the next flow of runoff water.

The storm drain and water trap assembly 10 is a maintenance-free system that operates automatically to open the underlying drain D when required, and to close the drain D when no runoff water is being collected. Accordingly, the assembly 10 is preferably constructed of durable materials that will preclude any need for maintenance or replacement for a considerable period of time. The structure of the insert 12, including its walls 18 and upper flange 22, is preferably formed of corrosion resistant steel (i.e., "stainless" steel), as are the floor 34 and walls 36 of the water trap 32. The springs 42 and their attachments 44 may also be formed of such corrosion resistant steel. Similarly, the grate 24 is preferably formed of corrosion resistant steel, but preferably includes a coating 48 of concrete overlying the steel components 50 as shown in FIGS. 2 and 3. The result is a maintenance free, fully automated system for allowing water runoff to flow into the drain system, while closing the drain system during dry conditions to prevent the escape of undesirable elements therefrom.

It is to be understood that the present invention is not limited to the embodiments described above, but encompasses any and all embodiments within the scope of the following claims.

I claim:

1. A storm drain with water trap, comprising:
   a drain insert having an open top, an open bottom, and a plurality of liquid impervious walls;
   wherein the walls of the insert taper upward and outward from the open bottom to the open top thereof; and
   a water trap resiliently suspended beneath the insert, the water trap having a liquid impervious floor and a plurality of liquid impervious walls extending upward therefrom;
   wherein the walls of the water trap taper upward and outward from the floor thereof; and
   wherein the water trap forms a seal with the open bottom of the insert when little water is contained within the water trap, the water trap being pushed away from the open bottom of the insert to open a water flow passage therebetween when sufficient water flows into the insert.

2. The storm drain with water trap according to claim 1 further comprising a porous grate secured atop the insert, over the open top thereof.

3. The storm drain with water trap according to claim 2, wherein the grate comprises a plurality of spaced apart steel members, each of the members having a coating of concrete therearound.

4. The storm drain with water trap according to claim 3 wherein the insert, the water trap, and the steel members of the grate are formed of corrosion resistant steel.

5. The storm drain with water trap according to claim 1, wherein the insert has a lower edge defining the open bottom thereof, the storm drain further comprising a resilient elastomeric seal disposed about the lower edge of the insert.

6. The storm drain with water trap according to claim 1, further comprising a plurality of resilient springs connecting the water trap to the insert.

7. A storm drain with water trap, comprising:
   a drain insert having an open top, an open bottom, and a plurality of liquid impervious walls;
   wherein the walls of the insert extend upward from the open bottom to the open top thereof; and a water trap resiliently suspended beneath the open bottom of the insert, the water trap has a liquid impervious floor and a plurality of liquid impervious walls;

wherein the walls of the water trap extend upward from the floor thereof, and the walls of the water trap being disposed outward of the walls of the open bottom of the drain insert; and a porous grate secured atop the insert, over the open top thereof.

8. The storm drain with water trap according to claim 7, wherein the grate comprises a plurality of spaced apart steel members, each of the members having a coating of concrete therearound.

9. The storm drain with water trap according to claim 8 wherein the insert, the water trap, and the steel members of the grate are formed of corrosion resistant steel.

10. The storm drain with water trap according to claim 7, wherein the insert has a lower edge defining the open bottom thereof, the storm drain further comprising a resilient elastomeric seal disposed about the lower edge of the insert.

11. The storm drain with water trap according to claim 7, further comprising a plurality of resilient springs connecting the water trap to the insert.

12. A storm drain with water trap, comprising:

a drain insert having an open top, an open bottom, and a plurality of liquid impervious walls;

a water trap resiliently suspended beneath the open bottom of the insert; and a porous grate disposed atop the insert, the grate comprising a plurality of spaced apart steel members, each of the members having a coating of concrete therearound;

wherein the walls of the insert taper upward and outward from the open bottom to the open top thereof; and wherein the water trap further includes a floor and a plurality of walls, the walls of the water trap tapering upward and outward from the floor thereof.

13. The storm drain with water trap according to claim 12, wherein the water trap has a liquid impervious floor and a plurality of liquid impervious walls extending upward therefrom.

14. The storm drain with water trap according to claim 12 wherein the insert, the water trap, and the steel members of the grate are formed of corrosion resistant steel.

15. The storm drain with water trap according to claim 12, wherein the insert has a lower edge defining the open bottom thereof, the storm drain further comprising a resilient elastomeric seal disposed about the lower edge of the insert.

16. The storm drain with water trap according to claim 12, further comprising a plurality of resilient springs connecting the water trap to the insert.

* * * * *